VERTICAL JUNCTION HARDENED SOLAR CELL

Filed Sept. 10, 1970

INVENTOR.
JOSEPH F. WISE
BY Harry A. Herbert Jr and Robert Kern Duncan
ATTORNEYS United States Patent Office 3,690,953
Patented Sept. 12, 1972

3,690,953

VERTICAL JUNCTION HARDENED SOLAR CELL

Joseph F. Wise, Dayton, Ohio, assignor to the United States of America as represented by the Secretary of the Air Force Filed Sept. 10, 1970, Ser. No. 70,965
Int. Cl. H01l 15/02
U.S. Cl. 136—89 1 Claim

ABSTRACT OF THE DISCLOSURE

A solar cell constructed from a slab of epitaxially grown silicon containing a plurality of very thin alternate N and P zones, cut, lapped, and polished to a thickness of approximately .010 inch, having a common deposited aluminum contact connecting on the back side of the cell to each of the N zones and another common deposited aluminum contact on the back side of the cell connecting to the P zones, and the cell oriented such that the direction of impingement of the solar energy on the front surface of the cell is in a direction generally parallel to the alternate zones of N and P material provides a high efficiency, hardened solar cell.

BACKGROUND OF THE INVENTION

The field of the invention is in the art of solar cell construction; and more particularly in that of solar cells, for use in outer space, that are relatively impervious (hardened) to neutron radiation.

Conventional solar cells are well known and in extensive common use. Improvements in the art are primarily in two fields; one, to provide more efficient cells and two, to provide cells that will operate in adverse environments. An example of the latter is contained in Pat. No. 2,984,775 granted to S. L. Matlow et al.

SUMMARY OF THE INVENTION

The invention provides a solar cell, primarily for use in outer space, having optimum conversion efficiency by having all charge carriers formed in relatively close proximity to a junction. This results in fifteen percent, or better, initial efficiency compared to approximately eleven percent initial efficiency for conventional cells. The construction disclosed also provides a cell that is much more radiation resistant because degradation of minority carrier diffusion length will affect conversion efficiency much less than in previous cell construction. Typically cells constructed as taught herein have a degradation of approximately five percent after exposure to $10^{12}$ one mev. neutrons per square centimeter whereas conventionally constructed cells exhibit approximately a 35% degradation. The combination of these two features results in cells that have approximately one hundred percent greater output than prior cells after exposure to severe nuclear or natural radiation. Due to the novel configuration of the cell all contacts on the top of the cell are eliminated, thus no dissimilar material interfaces are exposed to the radiation and survival of the cell is only dependent upon the survival of the silicon material. The combined results obtained from the disclosed structure is a cell that has a much longer operating life in outer space and an improved efficiency such that for output equivalent to prior devices approximately only one half the area, weight, and volume of existing similar devices is required.

DESCRIPTION OF THE PREFERRED EMBODIMENT

Figures 1, 2:
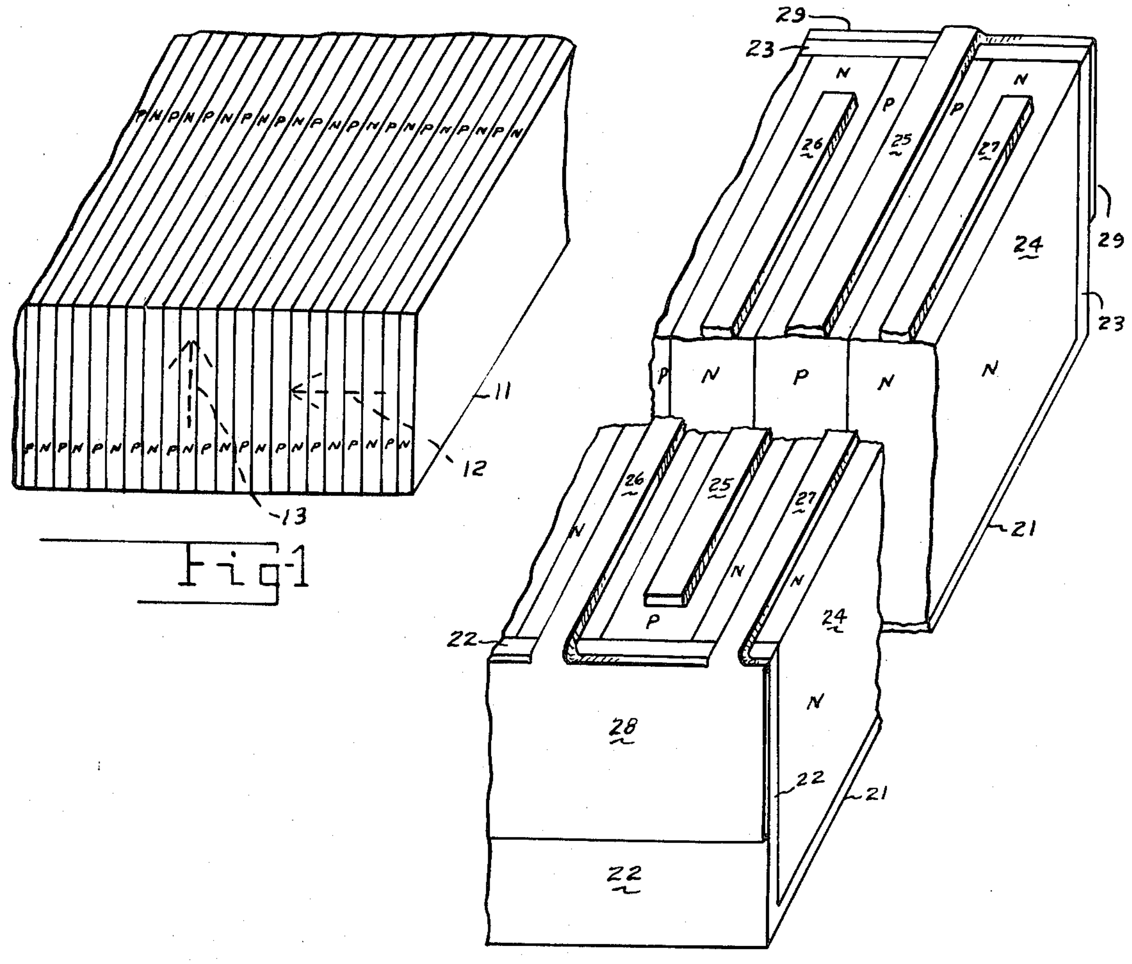
FIG. 1 is a pictorial representation of the silicon structure of a typical cell of the invention.
FIG. 2 is a partial view of the back side of a cell showing the aluminum contacts.

Referring to FIG. 1, the silicon crystal 11 composed of alternate N and P zones such as indicated, is preferably produced by growing epitaxially in the direction indicated by the arrow 12. An alternate, though generally not as preferable way of producing the crystal, is by vapor phase growing using conventional masking techniques. In this method of producing the crystal the growth is in the direction indicated by arrow 13. It is desirable that the N and P zones be relatively thin, so that all points within a cell are a maximum of only .0005 inch from a cell junction. Thus, one mil (or approximately 1000 zones per inch) is considered an optimum zone thickness for cells of this invention. The growing of the silicon material and the formation of the N and P zones is well known and will not be further described herein. After growing the silicon slabs they are cut and finished by lapping and polishing in the conventional manner to provide a thickness of approximately .010 inch in the direction of arrow 13. For this invention the dimension of .010 inch in thickness, that is, the dimension normal to the surface of the cell illuminated by solar energy, is critical in order to achieve the optimum efficiency and yet sustain the minimum damage from blast radiation.

After the silicon slab is cut, lapped, and polished a silicon dioxide ($SiO_2$) passivation layer approximately ½ mil thick is deposited in the conventional manner over the bottom and sides of the cell. This quartz layer protects the cell and also provides on the sides normal to the junction an electrical insulator on which the common electrical conductor for electrically connecting like zones is deposited. In FIG. 2, which is a partial view of a corner of the back side of a cell, this layer over the top of the cell, that is, the surface onto which solar energy impinges, is represented by the layer 21, and over the side of the cell facing the observer it is represented by the layer 22. Over the opposite side it is represented by the layer 23. For clarity of the view it is not shown over the side 24 of the layer of N material. In some applications of the invention where higher sensitivity is required it is desirable to apply a conventional interference coating such as $CeO_2$ (cerium oxide) on the top of the cell prior to applying the $SiO_2$ passivation coating to improve the absorption of the solar radiation.

After applying the transparent passivation coating, the rear surface of the cell is cleaned and the aluminum contacts (25, 26, and 27, as shown in the partial view of FIG. 2) and the aluminum bus bars 28 and 29 are applied using conventional techniques as used in the integrated circuit art and exemplified in Matlow et al. Pat. No. 2,984,775. It is to be observed that all connections to the N material are brought out to the common bus 28 which extends the total length of one edge of the cell, and all the connections to the P material connect with the common bus 29 on the opposite edge of the cell. The heights that the bus bars 28 and 29 extend up the edges should be sufficient to provide for the welding of good interconnections. Otherwise, the heights of the bus bars are not critical.

It is generally desirable after applying the aluminum connections to the zones on the back side of the cell to apply a passivation layer over it also to provide insulation and mechanical protection. Thus the cell is essentially covered with a quartz passivation layer except for the connecting bus bars 28 and 29. In addition to providing insulator pads for mounting the N and P contact bus bars and providing protection for the cell surfaces the passivation covering reduces surface carrier recombination and provides shielding from low energy proton radiation. It also provides optimum absorption of useful solar radiation particularly when coated over with an anti-reflection coating such as MgF (magnesium fluoride) as is conventionally used with glued on solar cell covers.

Figure 3:
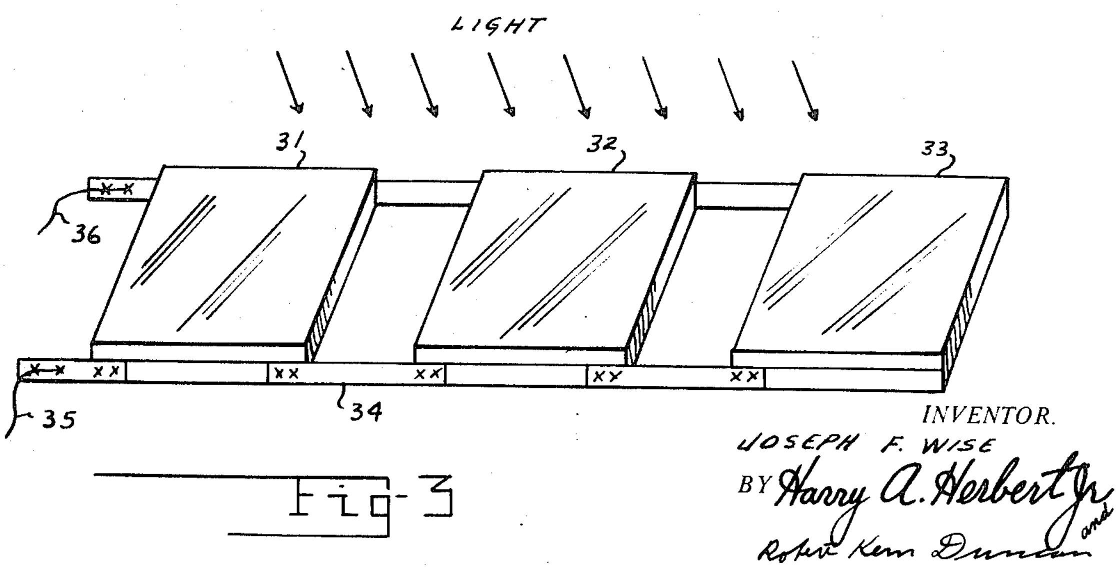
FIG. 3 is a pictorial view showing a typical parallel cell arrangement.

FIG. 3 shows a typical assembly of three cells connected in parallel. Typical embodiments of cells as taught herein are wafers measuring approximately one inch by one inch square and have a thickness of approximately .010 inch. The area of the wafer is not critical. The thickness is critical for optimum efficiency and cell life. The cells 31, 32, and 33 of FIG. 3 are interconnected by ultrasonic welding of aluminum interconnecting strips, such as strip 34 shown connecting like polarities of cells 31 and 32. Aluminum connecting leads welded to extending aluminum strips is the preferred means of connecting to the cells. It is to be understood that a plurality of cells may be interconnected in conventional series-parallel arrangements to provide any desired output voltage and current characteristics.

To provide the desired protection from blast radiation it is critical that aluminum be used for the electrical connections and that welding be used to connect to the aluminum.

I claim:

1. A hardened solar cell comprising:

(a) a wafer fabricated from epitaxially grown silicon having a plurality of alternate N and P zones with junctions therebetween and a dimension between each junction of approximately .001 inch, the said wafer having parallel front and back surfaces normal to the said junctions with a dimension between the said front and back surfaces of approximately .010 inch; a first edge surface normal to the said plurality of junctions, and an opposite second edge surface normal to the said plurality of junctions;

(b) a passivation layer of $SiO_2$ deposited over the front and edge surfaces of the said wafer;

(c) aluminum deposited on each of the said N zones on the back surface of the wafer contiguous with aluminum deposited on the said first edge of the wafer providing a common connecting surface on the first edge of the wafer to all the N zones;

(d) aluminum deposited on each of the said P zones on the back surface of the wafer contiguous with aluminum deposited on the said second edge of the wafer providing a common connecting surface on the second edge of the wafer to all P zones;

(e) a first aluminum connecting lead welded to the aluminum deposited on the first edge of the wafer;

(f) a second aluminum connecting lead welded to the aluminum deposited on the second edge of the wafer; and (g) the said wafer positioned to receive solar radiation on the said front surface of the wafer.

References Cited

UNITED STATES PATENTS

| | | | |
|---|---|---|---|
| 2,588,254 | 3/1952 | Lark-Horovitz et al. | 136—89 |
| 3,186,873 | 6/1965 | Dunlap, Jr. | 136—89 |
| 3,433,677 | 3/1969 | Robinson | 136—89 |
| 2,984,775 | 5/1961 | Matlow et al. | 136—89 UX |
| 2,919,299 | 12/1959 | Paradise | 136—89 |
| 3,460,240 | 8/1969 | Tarneja et al. | 136—89 X |
| 2,873,303 | 2/1959 | Rittner | 16—89 |
| 3,493,822 | 2/1970 | Iles | 136—89 X |

ALLEN B. CURTIS, Primary Examiner